United States Patent [19]
Coover, Jr. et al.

[11] 3,728,375
[45] Apr. 17, 1973

[54] CYANOACRYLATE ADHESIVE COMPOSITIONS

[75] Inventors: Harry W. Coover, Jr.; John M. McIntire, both of Kingsport, Tenn.;

[73] Assignees: Eastman Kodak Company, Rochester, N.Y.

[22] Filed: May 12, 1971

[21] Appl. No.: 142,816

[52] U.S. Cl............260/465.4, 260/465 D, 260/464, 252/522
[51] Int. Cl............C07c 121/30, C07c 121/48, C07c 121/52, C07d 9/00
[58] Field of Search...............260/465.4, 464, 465 D; 260/343

[56] References Cited

UNITED STATES PATENTS

| | | | |
|---|---|---|---|
| 2,467,926 | 4/1949 | Ardis | 260/465.4 |
| 2,467,927 | 4/1949 | Ardis | 260/465.4 |
| 2,721,858 | 10/1955 | Joyner et al. | 260/465.4 X |
| 2,763,677 | 9/1956 | Jeremias | 260/465.4 |
| 2,912,454 | 11/1959 | McKeever | 260/465.4 |
| 2,926,188 | 2/1960 | McKeever et al. | 260/465.4 |
| 3,360,124 | 12/1967 | Stonehill | 260/465.4 UX |

Primary Examiner—Joseph P. Brust
Attorney—Cecil D., Quillen, Jr., Elliott Stern

[57] ABSTRACT

This invention relates to cyanoacrylate adhesive compositions containing less than about 200 parts per million of water. These compositions have unique long-term adhesive activity which extends their utility for periods up to 2 years and longer.

10 Claims, No Drawings

CYANOACRYLATE ADHESIVE COMPOSITIONS

This invention relates to improved adhesive formulations and to a process for preparing them. More specifically, this invention relates to compositions based on cyanoacrylate adhesives which contain less than about 200 ppm of water. It is also concerned with a process for preparing these cyanoacrylate adhesive compositions having low water concentration.

The versatility of esters of α-cyanoacrylic acid (hereinafter sometimes referred to as "cyanoacrylates'") as adhesives is well known. These esters are well recognized to have excellent utility as high strength adhesives for bonding a great variety of materials such as glass, metals, plastics, rubber, wood, cement, paper, cloth, living tissue, etc., to themselves or to each other. These α-cyanoacrylate esters may be represented by the general formula

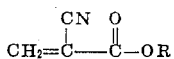

wherein $R$ is an alkyl group of 1–16 carbon atoms, a cyclohexyl group, a phenyl group, an alkoxyalkyl group of 2–16 carbon atoms, a haloalkyl group, an alkenyl group of 2–16 carbon atoms, an arylalkyl group, or an acylalkyl group or the like. When applied in monomeric form to the surface to be bonded, they set up rapidly to give a high strength adhesive bond between a variety of materials.

For many years, it has been recognized that the cyanoacrylate esters are polymerized by the presence of —OH groups to form a strong adhesive bond in a short period of time without the necessity of a catalyst. Although the mechanism by which these cyanoacrylates function as adhesives is not completely understood, it is believed that the polymerization of the cyanoacrylates may be initiated by the moisture present in the air, or any moisture present upon the substrate to be bonded. For the above reasons, it is generally believed that the cyanoacrylate esters produced by known processes are water free.

Surprisingly, it has been discovered that water in significant amounts is present in cyanoacrylate adhesive compositions produced by known processes. This is particularly significant in that workers skilled in the art believe the cyanoacrylate esters to be water free and that even minute amounts of water would initiate polymerization of the monomers. Even more unexpectedly, it has been discovered the water present in these compositions causes the hydrolysis of the cyanoacrylate esters, which in turn leads to the formation of acids. These acids have been found to retard the rate of polymerization of the cyanoacrylate thereby reducing the speed of bond formation. As the concentration of water increases, the rate of acid formation increases, and the loss of activity (i.e., ability to rapidly form a strong adhesive bond) of the cyanoacrylate adhesives is accelerated.

It is an objective of this invention, therefore, to provide cyanoacrylate adhesive compositions having less than about 200 ppm of water which have unexpected long term activity.

Another object of this invention is to provide a process for the preparation of these cyanoacrylate adhesive compositions having low water concentrations.

Other objects will be apparent from the description and claims which follow.

Numerous procedures have been described for preparing esters of cyanoacrylic acid. These include the following patents and articles: U. S. Pat. No. 2,467,926; U. S. Pat. No. 2,467,927; U. S. Pat. No. 2,721,858; U. S. Pat. No. 2,756,251; U. S. Pat. No. 2,763,677; U. S. Pat. No. 3,254,111; U. S. Pat. No. 3,465,027; French Pat. No. 1,504,237; U. S. Pat. No. 2,912,454; U. S. Pat. No. 2,926,188; U. S. Pat. No. 3,142,698; U. S. Pat. No. 3,444,233; Canadian Pat. No. 780,892; French Pat. No. 1,535,001; German Pat. No. 1,811,266; German Pat. No. 1,928,104; Austrian Pat. No. 262,948; U. S. S. R. Pat. No. 212,253; U. S. Pat. No. 3,463,804; British Pat. No. 1,130,638; S. Suzuki, H. Ito, and M. Yonwzawa, *Yuki Gosei Kagaku Kyokai Shi*, 27, 1224 (1969).

These methods generally involve the condensation of an ester of cyanoacetic acid with formaldehyde followed by pyrolysis of the intermediate to give the cyanoacrylate adhesive. Although these processes for preparing cyanoacrylates vary considerably in their complexity and in the quality of the resulting product, they all yield adhesives which lose their ability to rapidly form strong adhesive bonds within about one year or less. This fact is especially significant when considering the commercial potential of these adhesives. One major problem has been that the loss of activity of the cyanoacrylate adhesive occurring between the time of the initial preparation of the cyanoacrylate adhesives and the time the adhesives are commercially available would result in a product with a limited shelf life. This problem has been solved by the discovery that cyanoacrylate adhesives of this invention may be prepared containing less than 200 ppm. water and having a substantially increased activity and resulting increased shelf life.

Stabilization of the cyanoacrylate adhesives with a variety of inhibitors has been used to extend the shelf life of these adhesives. Such stabilizer systems are described in the following patents: U. S. Pat. No. 2,765,332; U. S. Pat. No. 2,794,788; U. S. Pat. No. 3,355,482; German Pat. No. 1,807,895; French Pat. No. 1,504,240; British Pat. No. 1,159,548. These stabilizer systems do enhance the shelf life of cyanoacrylates, but they do little to prolong the activity of the adhesives, and in some cases, they appear to accelerate the loss of activity. None of these patents disclose the unique results obtained by preparing cyanoacrylates with less than about 200 ppm. of water, nor do they anticipate that water is present in the cyanoacrylate adhesive compositions they are preparing and that it is causing the loss of adhesive activity. The cyanoacrylate adhesives produced by the above described processes have been found to have about 400 to 500 ppm. of water as a minimum, and may have considerably larger concentrations. Lowering the concentration of water to below 200 ppm., and preferably to about 100 ppm., greatly prolongs the activity of the adhesive because the hydrolytic processes leading to the formation of acids are markedly reduced. These cyanoacrylate adhesives having low levels of water maintain good activity up to two years and longer.

According to one aspect of this invention there is provided an adhesive composition comprising at least one monomeric α-cyanoacrylate ester of the formula

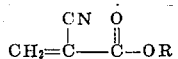

wherein R is an alkyl group of 1–16 carbon atoms, a cyclohexyl group, a phenyl group, an alkoxyalkyl group of 2–16 carbon atoms, a haloalkyl group of 1–10 carbon atoms, an alkenyl group of 2–16 carbon atoms, an arylalkyl group of 7–16 carbon atoms, or an acylalkyl group of 3–10 carbon atoms, said composition containing less than about 200 parts per million of water.

In an especially preferred embodiment of the invention, there is provided a cyanoacrylate adhesive composition as described above containing less than 100 ppm. of water. The cyanoacrylate adhesive compositions of this invention may be prepared by standard procedures, as described above with the improvement that the steps including and after the pyrolysis are performed under dry conditions. This is to say, all equipment and reagents used during pyrolysis and the following steps must be carefully dried and all transfer steps need be performed in a dry, inert gas atmosphere. The drying operation consists of heating the equipment, preferably under vacuum, followed by a thorough flushing with a dry inert gas. Other drying procedures are also satisfactory. The cyanoacrylate adhesive is also maintained in a dry inert gas atmosphere at all times. All materials which are used during the pyrolysis step and later, such as inhibitors, are dried. Standard drying procedures are satisfactory. The cyanoacrylate adhesive is then packaged in dry containers under a dry, inert gas atmosphere, the entire transfer operation being performed under this dry, inert gas atmosphere. The resulting cyanoacrylate adhesive compositions contain less than about 200 ppm. water. They have good activity for up to 2 years and longer.

If desired, polymerization inhibiting agents may be used. Suitable inhibitors or stabilizers are anionic polymerization inhibitors such as sulfur dioxide, nitrogen oxide, boron trifluoride, and free radical stabilizers such as hydroquinone, monomethylether of hydroquinone, nitrohydroquinone, as well as hydorquinone monoethylether.

Additives such as thickening agents, plasticizers, and the like may be added in order to improve the utility of the adhesive. Examples of suitable plasticizers include esters of cyanoacetic acid, succinic acid, sebacic acid and phthalic acid; glycerine triacetate; glycerine tributyrate; and substances such as those described in Joyner et al. in U. S. Pat. No. 2,784,127. In certain aspects it might be desirable to increase the viscosity of the cyanoacrylate adhesive composition. For this purpose, thickening agents or viscosity increasing agents may be added to the stabilized adhesive in order to change or enhance its usefulness for a particular purpose. Suitable thickening agents are poly-$\alpha$-cyanoacrylates, polyacrylates, polymethacrylates, cellulose acetates, and similar cellulose esters as well as other polymer materials which do not react with the monomers causing a premature polymerization and which preferably can be mixed with said monomers.

If desired, color can be imparted to the cyanoacrylate adhesive composition by the addition of the compositions described in U. S. Ser. No. 92,858, filed Nov. 25, 1970.

Specific examples of suitable cyanoacrylates are ethyl 2-cyanoacrylate, methyl 2-cyanoacrylate, isobutyl 2-cyanoacrylate, 3-methoxybutyl 2-cyanoacrylate, 2,2,2-trifluoroethyloxyethyl 2-cyanoacrylate, allyl 2-cyanoacrylate, hexyl 2-cyanoacrylate, butyl 2-cyanoacrylate, pentyl 2-cyanoacrylate, decyl 2-cyanoacrylate, octyl 2-cyanoacylate, chloroethyl 2-cyanoacrylate, butenyl 2-cyanoacrylate, benzyl 2-cyanoacrylate, acetoethyl 2-cyanoacrylate, and phenylethyl 2-cyanoacrylate.

This invention may be more fully understood by reference to the following illustrative examples, which are intended to describe certain embodiments of this invention. Parts and percentages are by weight, and temperatures are in degrees Centigrade unless otherwise specified.

Concentrations of water are determined by the following method. (ASTM D203-64).

A bottle containing the cyanoacrylate adhesive sample to be analyzed is carefully weighed ($\pm$ 0.1 milligram). 20 ml. of glacial acetic acid containing 20–80 ppm of water is introduced into a clean, dry, 2-oz., narrow mouth screw-cap bottle containing a magnetic stirring bar. The bottle is immediately closed with a polyethylene-lined screw cap. The sample of the cyanoacrylate adhesive is rapidly transferred from the weighed bottle into the 20 ml. of glacial acetic acid which is being stirred magnetically. The bottle containing the cyanoacrylate sample is reweighed to obtain the sample weight (usually 4 to 12 grams).

The sample titration flask, containing two platinum electrodes, is charged with 50 ml. of pyridine and 10 ml. of Karl Fischer reagent. The excess water is blanked out of the solvents using a 20-second hold time with the Karl Fischer titrating solution.

The contents of the bottle containing the glacial acetic acid and cyanoacrylate adhesive is immediately introduced into the titration flask and titrated using a 20-second hold time as the end point. A blank is then titrated using 20 ml. of the dry glacial acetic acid. The net titration is obtained by subtracting the blank titration from the sample titration. The concentration of water in the cyanoacrylate adhesive is calculated using the following equation:

ppm. $H_2O$ = [net titration $\times$ ([mg. water/ml. $I_2$ soln.]) $\times$ 1000/sample wt. (g.)]

Reference: J. Mitchell, Jr. and D. M. Smith, "Aquametry", Interscience Publishers, Inc., New York, 1948.

PREPARATION OF CYANOACRYLATE ADHESIVE COMPOSITIONS

The concentrations of water in cyanoacrylate adhesive compostions, which are prepared by the processes described in the various patents listed in the prior art, are listed in Table I. The concentrations are determined by the method described above.

A typical procecdure referred to hereinafter as "New Drying Procedure" is performed as follows:

Isobutyl cyanoacetate (135 g.), benzene (60 g.), paraformaldehyde (4 g.), 12.5 percent sodium hydroxide (1.2 g.), and piperidine (0.3 g.) are added to a 500-ml. three-necked, round-bottomed flask fitted with reflux condenser, stirrer, and dropping funnel, stirred, and heated to reflux. Isobutyl cyanoacetate (112 g.) and paraformaldehyde (42 g.) are mixed and the mixture is slowly added through the dropping funnel. Water is azeotroped from the reaction until no more distills from the reaction. The benzene is removed by distillation. The reactor is finally heated to 100°–130 °C. under vacuum (2–5 mm.) to insure the removal of low boiling materials. The molten reaction product is transferred to a 500-ml. two-necked flask fitted with distillation column and vacuum line. This equipment has been cleaned and dried by being acid washed, rinsed with distilled water and acetone, dried under high vacuum, and is maintained under a dry nitrogen atmosphere throughout the transfer operation. Polyphosphoric acid (4.0 g.) and hydroquinone (1.0 g.) which has been dried under high vacuum are added. The oligomeric intermediate is pyrolyzed at 165°–180 °C. under vacuum (2.0 mm.) in a stream of sulfur dioxide and the crude product is collected in a receiver containing polyphosphoric acid (3 g.) and dry hydroquinone (0.2 g.). The crude product is redistilled under vacuum (2.0 mm.) in a stream of sulfur dioxide and is collected in a receiver containing dry hydroquinone (0.05 g.). The product is transferred under dry nitrogen and stored in clean, dry containers.

TABLE I

Concentration of Water in Cyanoacrylate Adhesive Compositions Prepared by Various Methods

| Procedure Described In | 2-Cyanoacrylate Ester | ppm. H$_2$O |
|---|---|---|
| U. S. Pat. No. 2,467,926 | Methyl | 1120 |
| U. S. Pat. No. 2,721,858 | Ethyl | 660 |
| U. S. Pat. No. 3,254,111 | Isobutyl | 540 |
| U. S. Pat. No. 3,465,027 | 3-Methoxybutyl | 490 |
| U. S. Pat. No. 2,912,454 | Ethyl | 690 |
| U. S. Pat. No. 2,926,188 | Methyl | 580 |
| U. S. Pat. No. 3,444,233 | Hexyl | 730 |
| German Pat. No. 1,928,104 | 2,2,-Trifluoroethyoxyethyl | 620 |
| Austrian Pat. No. 262,948 | Methyl | 1970 |
| U. S. Pat. No. 3,463,804 | Ethyl | 550 |
| New Drying Procedure | Methyl | 90 |
| New Drying Procedure | Isobutyl | 70 |
| New Drying Procedure | Octyl | 110 |
| New Drying Procedure | 3-Methoxyethyl | 50 |
| New Drying Procedure | β,β,β-Trifluoroisopropyl | 120 |
| New Drying Procedure | Benzyl | 160 |

To demonstrate the unique long-term adhesive activity of these compositions, the following example is given.

ACTIVITY OF CYANOACRYLATE ADHESIVE COMPOSITIONS

One ounce of each of the above formulations is packaged in a dry 1 oz., polyethylene bottle. Formulations prepared using the new drying procedure are packaged in dry, 1-oz., polyethylene bottles under a dry nitrogen atmosphere. The samples are then aged in a circulating air oven at 50°C. This elevated temperature accelerates the aging process so that 50 days is equivalent to about 1 year under ambient conditions. Each sample is removed periodically, its grab time (amount of time required for the formation of a firm bond, i.e., a bond that cannot be pulled apart by hand) on freshly exposed nitrile rubber is measured. The lap shear strength on steel-to-steel bonds is determined after 2 minutes (ASTM D-1002). The results are given in Table II.

TABLE II

GRAB TIME AND BOND STRENGTHS OF CYANOACRYLATE ADHESIVE COMPOSITIONS PREPARED BY VARIOUS METHODS AFTER AGING AT 50°C.

| Preparative Procedure Described In | 2-Cyano-acrylate Ester | ppm. H$_2$O | Initial | | 25 Days Aged at 50°C | | 50 | | 100 | | 150 | |
|---|---|---|---|---|---|---|---|---|---|---|---|---|
| | | | Grab Time* | Lap Shear Strength, psi.** | Grab Time | Lap Shear Strength, psi. | Grab Time | Lap Shear Strength, psi. | Grab Time | Lap Shear Strength, psi. | Grab Time | Lap Shear Strength, psi. |
| New Drying Procedure | Methyl | 90 | <2 sec. | 1420 | <2 sec. | 1420 | <2 sec. | 1380 | <2 sec. | 1240 | <2 sec. | 1120 |
| New Drying Procedure | Isobutyl | 70 | <2 sec. | 870 | <2 sec. | 920 | <2 sec. | 850 | <2 sec. | 840 | <5 sec. | 620 |
| New Drying Procedure | Octyl | 110 | <2 sec. | 650 | <2 sec. | 640 | <2 sec. | 640 | <5 sec. | 420 | <5 sec. | 390 |
| New Drying Procedure | 3-Methoxy-ethyl | 50 | <2 sec. | 1240 | <2 sec. | 1170 | <2 sec. | 1020 | <2 sec. | 1060 | <5 sec. | 810 |
| New Drying Procedure | β,β,β-Trifluo-oroisopropyl | 120 | <2 sec. | 740 | <2 sec. | 650 | <2 sec. | 610 | <5 sec. | 440 | <10 sec. | 320 |
| New Drying Procedure | Benzyl | 160 | <5 sec. | 800 | <2 sec. | 790 | <2 sec. | 750 | <5 sec. | 610 | <5 sec. | 480 |
| U.S. Patent 2,467,926 | Methyl | 1120 | <2 sec. | 720 | Polymerized | | >10 sec. | 60 | >10 sec. | 0 | | |
| U.S. Patent 2,721,858 | Ethyl | 660 | <2 sec. | 1140 | <5 sec. | 710 | | | | | | |

TABLE II

GRAB TIME AND BOND STRENGTHS OF CYANOACRYLATE ADHESIVE COMPOSITIONS PREPARED BY VARIOUS METHODS AFTER AGING AT 50°C.

| Patent | Ester | | | | | | | | | |
|---|---|---|---|---|---|---|---|---|---|---|
| U.S. Patent 3,254,111 | Isobutyl | 540 | <2 sec. | 820 | <10 sec. | 180 | >10 sec. | 40 | >10 sec. | 0 |
| U.S. Patent 3,465,027 | 3-Methoxybutyl | 490 | <2 sec. | 640 | <10 sec. | 300 | >10 sec. | 20 | >10 sec. | 0 |
| U.S. Patent 2,912,454 | Ethyl | 690 | <2 sec. | 1090 | <5 sec. | 790 | >10 sec. | 210 | >10 sec. | 0 |
| U.S. Patent 2,926,188 | Methyl | 580 | <2 sec. | 1410 | <5 sec. | 970 | >10 sec. | 340 | >10 sec. | 0 |
| U.S. Patent 3,444,233 | Hexyl | 730 | <2 sec. | 670 | <10 sec. | 210 | >10 sec. | 0 | | |
| German Patent 1,928,104 | 2,2,2-Trifluoroethoxyethyl | 620 | <2 sec. | 820 | <10 sec. | 240 | >10 sec. | 0 | | |
| Austrian Patent 262,948 | Methyl | 1970 | <5 sec. | 620 | >10 sec. | 0 | | | | |
| U.S. Patent 3,463,804 | Ethyl | 550 | <2 sec. | 1210 | <5 sec. | 840 | >10 sec. | 190 | >10 sec. | 0 |

\* Grab Time - <2 sec. - Excellent Activity; <5 sec. - Good Activity; <10 sec. - Fair Activity; >10 sec. - Poor Activity
\*\* Lap Shear Strength is the average of three breaks of 1/4 sq. in. bond prepared between 2 steel specimens 2" x 1/2" x 1/16".

Table II illustrates the advantageous results obtained when the compositions of the present invention are compared with compositions prepared according to the processes of the prior art. Note that there is substantial increase in long term adhesive activity of the compositions of the present invention and surprisingly there is also a marked increase in lap shear strength as well. It is most surprising to find that after 50 days of aging at 50°C. the cyanoacrylate adhesive compositions prepared under the new drying procedures are characterized by a lap shear strength of at least about 600 psi., whereas under similar conditions the highest lap shear strength recorded for cyanoacrylate adhesives prepared under prior art procedures are no higher than about 350 psi.

The invention has been described in detail with particular reference to preferred embodiments thereof, but it will be understood that variations and modifications can be effected within the spirit and scope of the invention.

We claim:

1. Monomeric α-cyanoacrylate esters of the formula

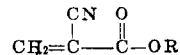

wherein R is an alkyl group of 1–16 carbon atoms, a cyclohexyl group, a phenyl group, an alkoxyalkyl group of 2–16 carbon atoms, a haloalkyl group of 1–10 carbon atoms, an alkenyl group of 2–16 carbon atoms, an arylalkyl group of 7–16 carbon atoms, or an acetoethyl group, said composition containing from about 200 to about 50 parts per million of water.

2. The composition of claim 1 containing less than about 100 parts per million of water.

3. The composition of claim 1 wherein the α-cyanoacrylate ester is methyl 2-cyanoacrylate.

4. The composition of claim 1 wherein the α-cyanoacrylate ester is ethyl 2-cyanoacrylate.

5. The composition of claim 1 wherein the α-cyanoacrylate ester is butyl 2-cyanoacrylate.

6. The composition of claim 1 wherein the α-cyanoacrylate ester is isobutyl 2-cyanoacrylate.

7. The composition of claim 1 wherein the α-cyanoacrylate ester is pentyl 2-cyanoacrylate.

8. The composition of claim 1 wherein the α-cyanoacrylate ester is allyl 2-cyanoacrylate.

9. The composition of claim 1 wherein the α-cyanoacrylate ester is methoxyethyl 2-cyanoacrylate.

10. The composition of claim 1 wherein the α-cyanoacrylate ester is ethoxyethyl 2-cyanoacrylate.

\* \* \* \* \*